United States Patent [19]

Shah

[11] Patent Number: 6,029,065
[45] Date of Patent: Feb. 22, 2000

[54] REMOTE FEATURE CODE PROGRAMMING FOR MOBILE STATIONS

[75] Inventor: Bharat Shah, San Diego, Calif.

[73] Assignee: Nokia Mobile Phones, Ltd., Espoo, Finland

[21] Appl. No.: 08/841,850

[22] Filed: May 5, 1997

[51] Int. Cl.[7] ..................................................... H04Q 7/20
[52] U.S. Cl. ........................ 455/414; 455/415; 455/418; 455/419; 379/201; 379/211; 370/259; 370/271
[58] Field of Search ................................... 455/414, 415, 455/416, 417, 418, 419, 432, 435, 550; 370/271, 259, 465; 379/201, 207, 211, 212, 214

[56] References Cited

U.S. PATENT DOCUMENTS

| | | | |
|---|---|---|---|
| 5,159,625 | 10/1992 | Zicker | 379/59 |
| 5,216,703 | 6/1993 | Roy | 379/59 |
| 5,297,191 | 3/1994 | Gerszberg | 455/419 |
| 5,297,192 | 3/1994 | Gerszberg | 455/419 |
| 5,301,232 | 4/1994 | Mulford | 380/21 |
| 5,343,494 | 8/1994 | Averst et al. | 375/1 |
| 5,381,138 | 1/1995 | Stair et al. | 340/825.44 |
| 5,404,355 | 4/1995 | Raith | 370/311 |
| 5,418,837 | 5/1995 | Johansson | 455/558 |
| 5,425,077 | 6/1995 | Tsoi | 379/58 |
| 5,459,774 | 10/1995 | Breeden | 379/58 |
| 5,479,476 | 12/1995 | Finke-Anlauff | 455/550 |
| 5,533,019 | 7/1996 | Jayapalan | 370/352 |
| 5,577,100 | 11/1996 | McGregor et al. | 379/58 |
| 5,577,103 | 11/1996 | Foti | 455/412 |
| 5,590,398 | 12/1996 | Matthews | 455/33.1 |
| 5,794,142 | 8/1998 | Vantilla et al. | 455/419 |
| 5,794,156 | 8/1998 | Alanara | 455/517 |
| 5,842,124 | 11/1998 | Kenagy et al. | 455/418 |

OTHER PUBLICATIONS

Vertical Service Code Assignment Guidelines, Doc. No. Inc 96–0802–015, Industry Carriers Compatibility Forum (ICCF), Revised Aug. 2, 1996.

*Primary Examiner*—Wellington Chin
*Assistant Examiner*—Isaak R. Jama
*Attorney, Agent, or Firm*—Brown Martin Haller & McClain, LLP

[57] ABSTRACT

The base station of a wireless communications network determines what features a mobile station will support, then downloads information to the mobile station which will notify the mobile station of which network features are available and how they may be accessed in the local network. Specifically, the base station provides the features codes that are required to access the network features. The base station may also inquire into what features the mobile station supports. Each of these communications may take place over the combination of the Paging Channel/Access Channel, collectively, the Control Channel, or the Traffic Channel. With the downloaded information, the mobile station user may select a desired feature using the method to which he or she is accustomed, i.e., either by selecting a menu location or by entering a familiar sequence of keystrokes. The mobile station's internal processor converts the entered values into the feature codes corresponding to the selected features within the network. The process of downloading the feature code information does not require the user's intervention, such that any conversion required from the user's familiar feature access process is transparent to the user.

29 Claims, 3 Drawing Sheets

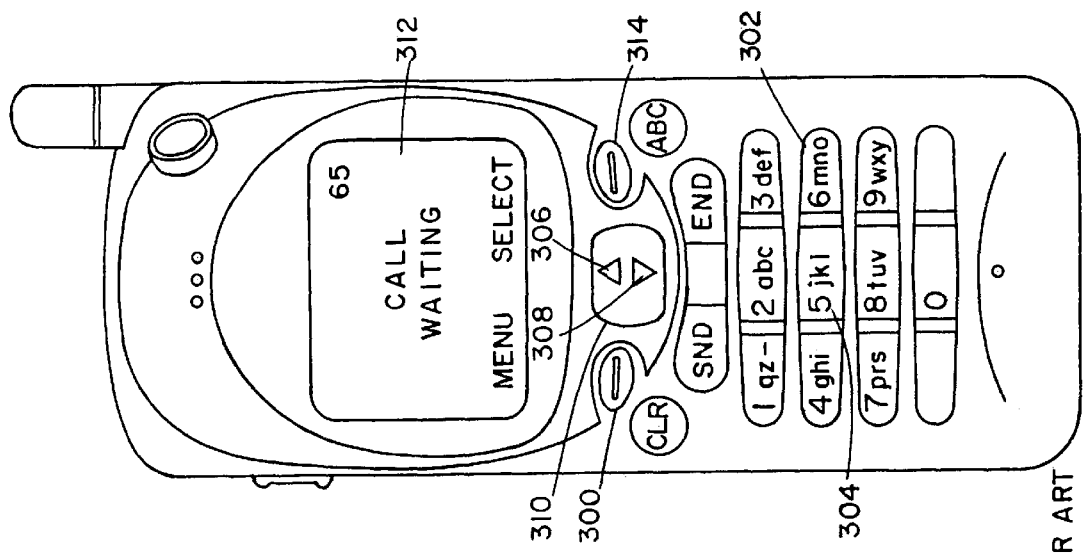
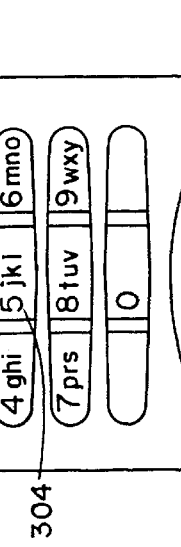
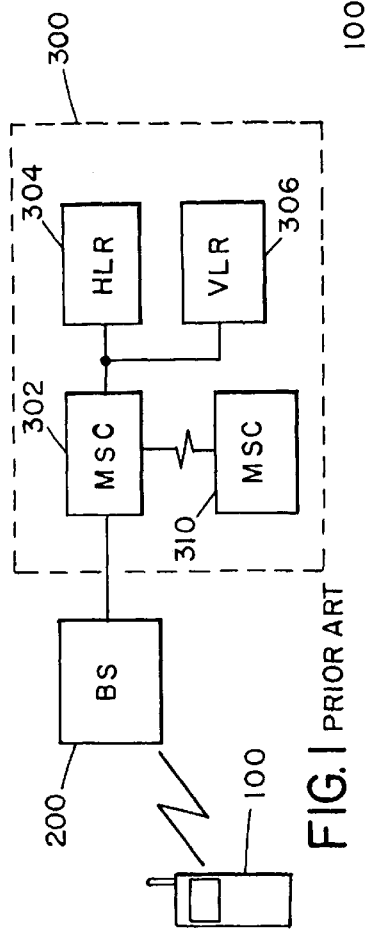
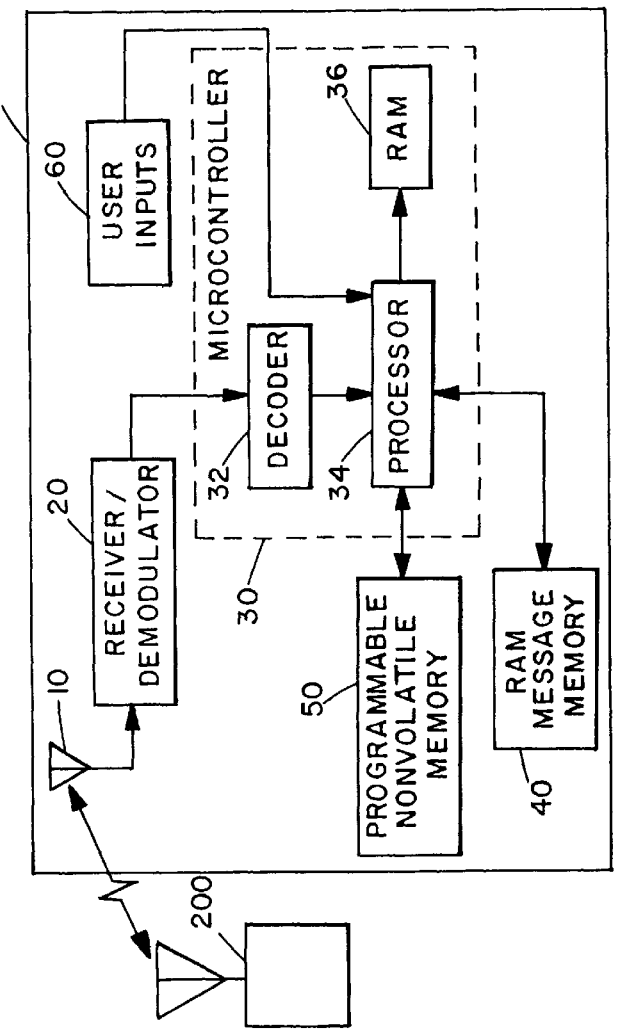
FIG. 1 PRIOR ART
FIG. 2 PRIOR ART
FIG. 3 PRIOR ART

REMOTE FEATURE CODE PROGRAMMING FOR MOBILE STATIONS

FIELD OF THE INVENTION

This invention relates generally to programming of network feature codes in mobile stations, and more specifically for providing a user-transparent conversion of one or more of a set of network feature codes in a mobile station to facilitate use of network features which must be accessed using a different set of feature codes.

BACKGROUND OF THE INVENTION

Telephone service carriers, including both mobile cellular and PCS networks, provide a number of different features which may be used by a network subscriber at the subscriber's discretion. A non-exhaustive list of features which may be provided include Call Forwarding, Call Waiting, Calling Number Identification, Automatic Callback, Conference Calling, Message Waiting Notification, Call Encryption, Selective Call Acceptance, Voice Mail, Enhanced Vocoder, and Cost of Call Notification. Activation or deactivation of such features typically involves the completion of a sequence of keystrokes on the keypad to enter the "feature code", also known as a "vertical service code" or "VSC", for selecting or de-selecting the desired feature. The keystrokes may involve the entry of a numeric sequence preceded by the star key (*) and/or followed by the pound key (#), e.g., "*66#", or may involve the selection of a dedicated menu by pressing a "Menu" key followed by a one- or two-digit number, one or more soft keys, or by scrolling the menu screen. Even when a mobile unit has menu capability, the feature code value specific to the home network is commonly a numeric sequence as above, with selection of the "Menu" key being sent as a star key to indicate a feature code. In this case, the feature code value is programmed upon activation of the feature to correspond to a particular menu location, and the actual feature code value is unknown to the user.

While the network subscriber may become thoroughly familiar with the procedure for access feature codes within his or her home network and mobile phone, several obstacles to the optimal usage of such features exist as a result of the lack of standardization within the communications industry. These obstacles may appear because, for example, the feature code for any given feature may be different from one network to another, not all networks provide all features, and there is a large number of different types of telephones, many of which may not support such features, or which have their own pre-determined menu-based sequence for selecting feature codes. While these issues may pose little practical difficulty for wire-based network subscribers, mobile phone users frequently travel between coverage areas of different network service providers and, thus, are likely to experience the loss of, or inability to control, a desired feature. Under current practices, the only way that a mobile user can determine whether his or her feature code matches the corresponding code for the visited network is to try it. If the entered value matches, an acknowledging tone or message will be received at the mobile unit. If the code does not match, a different tone or message will indicate an unsuccessful entry. While little may be done if a mobile user has entered an area covered by a visited network that simply does not offer a desired feature, the typical user does not want to go to the time and trouble if, even when the visited network provides the feature, the only way to control the feature is to request the assistance of that network's customer service representative. In addition to the problem of dealing with different feature codes used in visited networks, even if the mobile user is not traveling between networks, advances in technology and increased competition between service providers is resulting in the availability of new network features which must be enabled in the mobile stations of existing subscribers within the mobile's home network.

FIG. 1 provides a diagram of the functional entities within a network to illustrate how feature codes are handled in a conventional wireless communications network. Generally, the network consists of the Mobile Station 100, the Base Station 200 and the switching system 300 (designated by dashed lines). Within switching system 300 is the Mobile Switching Center (MSC) 302, for the first network, Home Location Register (HLR) 304 and Visitor Location Register (VLR) 306. MSC 310 is a second Mobile Switching Center corresponding to the home network for Mobile Station 100, which is connected to MSC 302 via conventional wired-based connection for communicating information regarding MS 100 to the visited network. Under current feature code implementation procedures, once MSC 302 receives a "*" or "Menu" input ("Menu" will be seen by the MSC as a star) from MS 100 (via BS 200), it transfers the information to HLR 304, which stores and manages subscriptions, and contains permanent subscriber information. If MS 100 is operating within its home network, HLR 304 will recognize the feature code entered by the mobile user and provide the requested response. If MS 100 is outside of its home network, MSC 302 will transfer information about the mobile station to VLR 304, which contains temporary information needed by MSC 302 to serve visiting mobile stations. If a star key ("*") is pressed followed by two digits to activate a feature code by a visiting mobile station, the message will still be processed through HLR 304. Using procedures established under the IS-41 standard for inter-network communications, MSC 310 is contacted by MSC 302 once it is determined that MS 100 is outside of its home network to provide the information necessary for MSC 302 to communicate with MS 100. Since HLR 304 processes feature codes under current procedures, and since it contains only information regarding the system's own subscribers, it is unable to process feature codes from visiting mobile stations if the requested feature code value differs from its own value. Attempts by a visiting mobile station to access a feature code with a different value, or a feature not supported by the visited system, will be met with a busy signal, or some other indication that the requested feature is unavailable.

Industry efforts are being made to standardize certain feature codes and the requirements for activating them under Telecommunications Industry Association/Electronics Industries Association Interim Standard 52-A (TIA/EIA/IS-52-A), and/or INC 96-0802-015 ("Vertical Service Code Assignment Guidelines"), incorporated herein by reference, which will be of assistance with new networks and new mobile units once the standardization is completed. Delays in implementation of the new standardized feature codes in existing networks are likely to be on the order of two or three years from Final Closure of the issue, which occurred in August 1996.

The newer standards provide for a shift of the processing of feature codes to the Mobile Switching Center, which, while having the advantage of removing the previous limitation created by handling the feature codes in the Home Location Register, still requires standardization of the feature codes amongst all mobile phone manufacturers in order to make sure that every mobile station uses the feature code recognized by the MSCs. Because many mobile phone manufacturers have developed their own systems and preferences, it is unlikely that a consensus could be achieved for adopting a single menu standard or a single numeric sequence for accessing feature codes from every mobile phone, regardless of manufacturer. Further, new features are certain to be added in the future, which will need to be implemented in existing networks and subscriber mobile units. Accordingly, the need remains for means to enable mobile users to readily access network features across multiple networks without requiring the user to learn additional feature codes.

SUMMARY OF THE INVENTION

It is an advantage of the present invention to provide means for allowing a mobile user to access network features without requiring knowledge of the network's specific feature codes.

It is another advantage of the present invention to provide means for programming a mobile station with information to provide a user-transparent conversion of a first set of network feature codes to a different, second set of feature codes which are recognized by the mobile station.

In an exemplary embodiment, the method for remote feature code programming first registers a visiting mobile station using the standard registration procedures provided for in the established industry standards to notify the visited network base station of the mobile station's presence. According to these standards, which include the TIA/EIA/IS-95 and ANSI-J-008 standards, when a mobile user visits a network, registration procedures are used to enable the visited network to identify the mobile unit network connection and paging purposes, and the mobile station's home network, for billing purposes. Once registered, the base station will download information to the mobile station which will notify the mobile station of which network features are available and how they may be accessed in the local network. The base station may also inquire into what features the mobile station supports. Each of these communications may take place over the combination of the Paging Channel/Access Channel, collectively, the Control Channel, or the Traffic Channel. With the downloaded information, the mobile station user may select a desired feature using the method to which he or she is accustomed, i.e., either by selecting a menu location or by entering a familiar sequence of keystrokes. The mobile station's internal processor converts the entered values into the feature codes corresponding to the selected features within the network. The process of downloading the feature code information does not require the user's intervention, such that any conversion required from the user's familiar feature access process is transparent to the user.

The downloading step for providing a new set of feature codes may be included in any of a number of different established messages. For example, using the Control Channel, the base station may include the feature code data in either the Mobile Station Registered Message, when the mobile station attempts to originate a call after registration, or in some other forward channel message, such as a Page Message. The process may also occur over the Traffic Channel, for example, in a Data Burst Message, or can be done using a combination of messages communicated over the Control and Traffic Channels, such as in the Over-the-Air Parameter Administration (OTAPA) method disclosed in co-pending application Ser. No. 08/837,970, filed Apr. 15, 1997, of the present inventor.

The downloaded information may contain a list of network features that are supported by the visited network and how those features may be accessed. This access information may be stored in the mobile station's memory as Reverse Channel Information Records, or in some other memory location to which the mobile station's processor may refer to translate entries from the mobile station's menu, or other known feature code keying sequences, into the system-specific feature codes for the visited network. When the mobile user selects a feature to activate or deactivate, the sequence of keystrokes with which he or she is familiar, or which is selected via the menu display of the mobile unit, is entered. The information for the selected feature which is stored in the Reverse Channel Information Records is then transmitted to the base station with an appropriate reverse channel message, such as a Page Response Message, Status Message, or Flash with Information Message, along with a request for acknowledgment, when the mobile user wishes to activate or deactivate the feature. The base station responds indicating activation or deactivation of the selected feature. If the visited network does not support a particular feature, the base station will respond with an indication of that fact, causing a busy signal or some other tone to be heard by the user. If the mobile unit has a display screen, information the phrase "feature not available" may be displayed following entry of the keystrokes for that feature.

When new features become available within a network, even within the mobile station's home network, the network base station can download the information required to access the new feature using the same procedure. Similarly, if the home network changes its feature code values, for example, if it adopts a standardized set of feature code values, the home network will be able to provide this information to the mobile station without requiring the mobile user to relearn an entire set of feature codes. If the mobile unit does not have a display, external notification of the new feature should be provided to the subscriber, e.g., by mail. If the mobile unit has a display screen, the information downloaded can include a message for display to the user to notify the user of the new feature and how it may be accessed. For mobile phones with menu displays, the new feature may be added to the menu, and may be accessed by stepping or scrolling through the menu.

Downloading of the local feature codes does not require access of the mobile unit's protected memory, and the information can be exchanged as part of standard registration procedures, over the Control Channel, or over the Traffic Channel. This procedure may be used regardless of whether the mobile unit is located in its home network or in a visited network. Since the local feature codes may be changed frequently if the mobile user travels often, and since the information can be downloaded/refreshed during every activation procedure or paging sequence, if necessary, the local network's feature codes may be stored in the phone's temporary memory, much like a list of recent calls.

Where a feature is subject to a subscription charge and requires provisioning, for example, a high quality vocoder option, information regarding support of such a feature, selection of the appropriate feature code, and acceptance of billing terms may preferably be communicated on the Traffic Channel due to that fact that a number of messages and responses may need to occur for the transaction. During a combination of communications over the Control and Traffic Channels, the transactions can occur for notifying the user of a surcharge, responding with acceptance of the surcharge, and activation of the feature if accepted by the user.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which:

FIG. 1 is a block diagram of an exemplary prior art communications network including a mobile station, a base station and a switching system;

FIG. 2 is a block diagram of an exemplary mobile phone receiver;

FIG. 3 is a diagrammatic view of a mobile unit handset with a menu display;

DETAILED DESCRIPTION OF A PREFERRED EMBODIMENT

Figure 4:
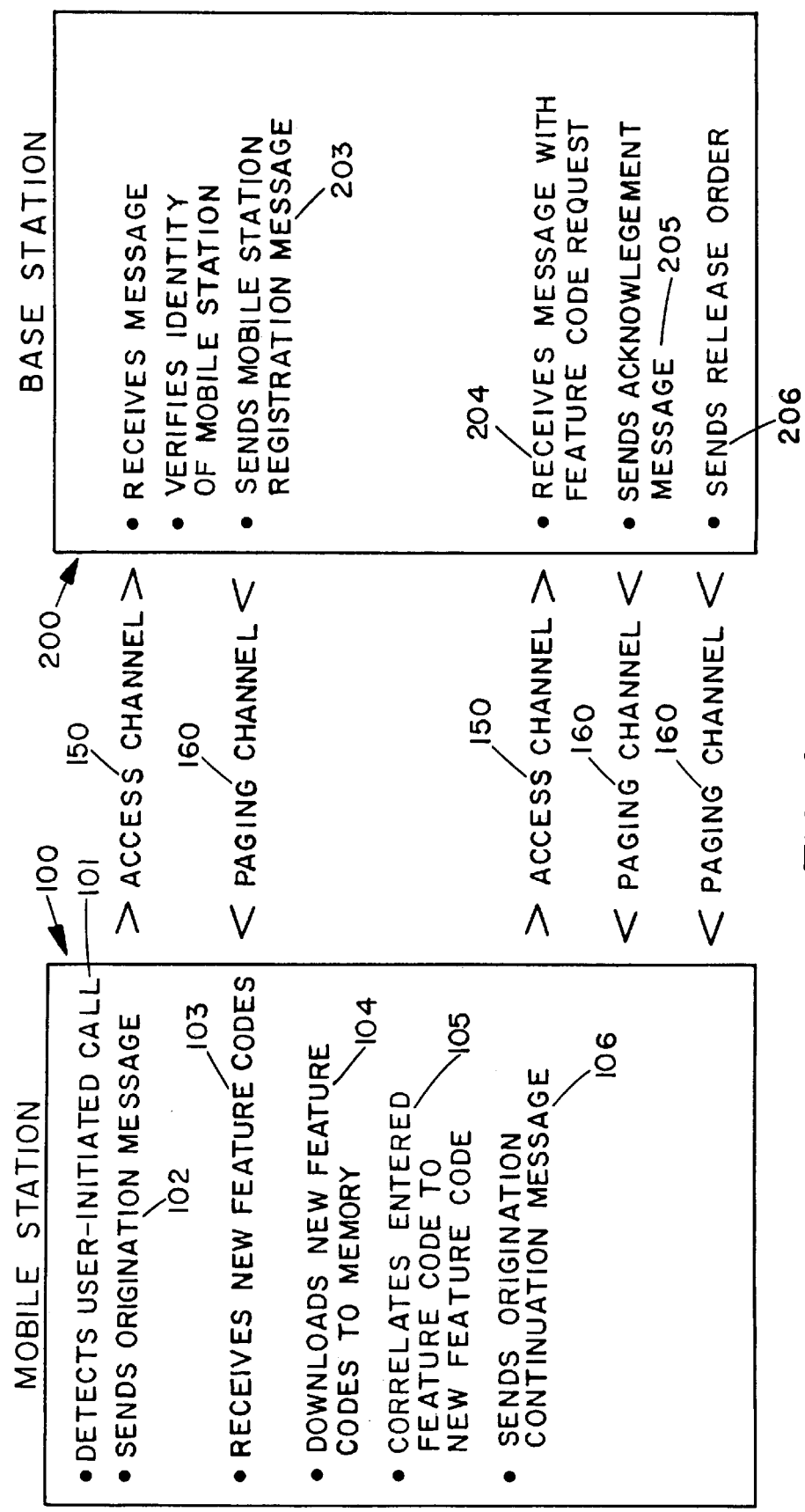
FIG. 4 is a diagram of an exemplary call flow for changing a Feature Code List according to one embodiment of the present invention.

The following detailed description utilizes a number of acronyms which are generally well known in the art. While definitions are typically provided with the first instance of each acronym, for convenience, Table 1 below provides a list of the acronyms and abbreviations used herein along with their respective definitions.

TABLE 1

| ACRONYM | DEFINITION |
| --- | --- |
| ANSI | American National Standards Institute |
| BS | Base Station |
| CDMA | Code Division Multiple Access |
| EF | Extended Feature |
| EFCC | Extended Feature Change Code |
| EIA | Electronics Industries Association |
| ESN | Electronic Serial Number |
| HLR | Home Location Register |
| INC | Industry Numbering Committee |
| IMSI | International Mobile Station Identity |
| IS | Interim Standard |
| MIN | Mobile Identification Number |
| MS | Mobile Station |
| MSC | Mobile Switching Center |
| NID | Network Identification |
| OTAPA | Over-the-Air Parameter Administration |
| OTASP | Over-the-Air Service Provisioning |
| RAM | Random Access Memory |
| SID | System Identification |
| SMS | Short Message Service |
| TIA | Telecommunications Industry Association |
| TSB | Technical Service Bulletin |
| VLR | Visitor Location Register |
| VSC | Vertical Service Code |

It should be noted the font variations within the specification and claims, particularly italicized text and text in all capital letters, reflect the formats established according to the various standards which are applicable to wireless communications, e.g., IS-95.

Referring to FIG. 2, a conventional mobile phone receiver, which is generally designated by reference numeral 100, typically comprises an antenna 10 for receiving call signals. The received signals are provided to a receiver and a demodulator circuit 20 and the resulting digital signal is fed to a microcontroller 30. Microcontroller 30 comprises a decoder 32, a processor 34, and an internal RAM 36. The digital signal is decoded by the decoder 32 and processed by processor 34, which reads from or writes to internal RAM 36. Memory storage for optional features, messages, and other data is provided by RAM 40. The user can enter data into processor 34 via user input circuitry 60.

A non-volatile memory 50 is coupled to processor 34 for storage of information necessary for the operation of mobile phone receiver 100. The memory can be an electrically erasable programmable read only memory (EEPROM), a battery backed up memory device, or a similar memory device which retains information even when power is not applied to the mobile phone. Processor 34 accesses information such as options for various features from non-volatile memory 50 during operation, and can alter information in the memory 50 by reprogramming in accordance with the present invention.

The following detailed description specifically refers to the protocol and procedures for operating a CDMA network conforming with the TIA/EIA/IS-95 standard (which is incorporated herein by reference), however, it will be apparent to those skilled in the art that by substituting the corresponding protocol and processes for various analog or PCS network architectures, the inventive feature code programming method may be similarly implemented in other wireless communications networks.

Stored within the programmable non-volatile memory 50 of mobile phone receiver 100 is the phone's identifying information, including its mobile identification number (MIN for analog; IMSI for CDMA), electronic serial number (ESN), network identification (NID), system identification (SID), home registration indicator ($HOME_{13}$ REG), along with other information which will allow the network base station 200 to locate, page, and determine the characteristics and capabilities of the mobile station. According to IS-95 procedures, certain of this information must be changed within the mobile station's memory in order for the mobile station to operate within a visited network.

Whenever the mobile station enters the visited network, registration procedures are initiated. As is known in the art, the manner of initiation of registration procedures depends upon how the mobile station is set-up, and may be autonomously initiated by time, distance, zone, powering up and/or powering down the unit while the mobile unit is roaming. Autonomous registration procedures may take place when the mobile unit is active, while on the Traffic Channel, or when it is in the Mobile Station Idle State, while the mobile unit monitors the Paging Channel, and does not require the user's intervention. Other registration procedures occur when the mobile station changes its stored parameters or when it enters a new system (Parameter-change registration), or when it receives messages from the base station over a Paging Channel or Traffic Channel. Generally, the autonomous registration procedures are directed toward preparing the mobile station for communicating with the base station so that registration can be completed once the mobile station is activated for communicating on a Traffic Channel.

Continuing the registration process as provided under standardized procedures, a network base station sends system overhead messages on the Paging Channel to provide the mobile station with the information it needs to operate with the base station. Included within the overhead messages is the identifying and operating information for the base station. A mobile station in the Mobile Station Idle State monitors the Paging Channels in accordance with standardized procedures. Upon receipt of a Page Message containing the identifying and operating information for the base station, the mobile station compares the configuration message sequence number to the corresponding number stored in its memory. If the comparison results in a match, the system parameters are the same as those already stored, and the mobile station ignores the message. If a mismatch results, the mobile station enters the Update Overhead Information Substate and stores the appropriate parameters as Reverse Channel Information Records. Detection of a mismatch at this point may be used to trigger the procedure for downloading a new set of feature codes from the base station to the mobile station. The new set of feature codes may be included in this message in one embodiment of the programming method. The mobile station transmits a Page Response Message to confirm the downloading of the updated parameters and to notify the base station that the mobile station subscribes to certain network features.

In another embodiment, rather than downloading the feature codes over the Paging Channel, the procedure continues. Still on the Paging Channel, the base station sends a Channel Assignment Message directing the mobile station to move to an assigned Traffic Channel. The mobile station processes the Channel Assignment Message and sets up the designated Traffic Channel according to IS-95 procedures. The base station transmits a Status Request Message inquiring into the features supported by the mobile station, to which the mobile station responds with a Status Response Message to identify the supported features. (Note that this exchange may occur even if the mobile station is in the Conversation Substate.)

During any one of the above Forward Channel communications, the base station can include a message containing the corresponding feature codes that are to be used in the visited network. These new feature codes are stored in the mobile station's memory as additional Reverse Channel Information Records. The mobile station's processor will then transmit these new feature codes in place of the previously-programmed feature codes whenever the user wishes to access a particular feature. Thereafter, when the mobile user attempts to activate or deactivate a particular network feature, entry of the keystroke sequence to which the user is accustomed will automatically cause the mobile station to transmit the appropriate system-specific feature code to the base station.

Alternatively, rather than requiring an additional inquiry into the supported feature codes, since the base station has already ascertained that the mobile station is likely to have a different set of feature codes based upon the mismatch of other system and network identities during registration, the new feature code information may be automatically transmitted from the base station along with the Mobile Station Registered Message. This message, which includes the parameters for communicating with the base station, will store the new system and network information into the mobile's memory.

In an embodiment in which the mobile user subscribes to a network feature for which a subscription fee is charged, such as enhanced vocoder capability, voice mail, voice dialing, or conference calling, the feature must be provisioned, when initially subscribed to, when the mobile user wishes to utilize the feature outside of his or her home network, and/or when the subscribed features are changed. Access to the feature, hereinafter referred to as an "extended feature", may be provided using the over-the-air programming protocol and procedures which support the Over-The-Air Service Provisioning (OTASP) feature in accordance with established industry standards (TIA/EIA/IS-683) in a procedure for Over-The-Air Parameter Administration (OTAPA). A difference between the OTAPA and OTASP procedures is that initiation of the OTAPA procedure does not require the intervention of the mobile user.

The mobile phone is pre-programmed with a service option for changing or adding extended subscriber features, which includes assignment of an Extended Feature (EF) number. The mobile phone will also have one or more extended features change codes (EFCCs) in its memory. The network, whether it is the mobile's home network or a visited network, possesses means for determining whether a mobile phone is OTAPA capable. Note that the visited network may establish OTAPA support for a particular mobile station using IS-41 communications with the home network, however, protocol for the transfer of such information will need to be added to the IS-41 standard.

In the OTAPA procedure, the network base station sends a General Page Message to the mobile phone using the EF number. After first verifying its identity using the standardized Authentication process, if the mobile phone has OTAPA capability, it responds with a Page Response Message, indicating support for the EF by sending the EF number. If the mobile station does not support the option, the response will indicate that the option is not available. Once the presence of the option is confirmed, the base station transmits a Channel Assignment Message, telling the mobile station to proceed to the Traffic Channel. In order to prevent unauthorized access to the mobile user's billing records, it may be desirable to use the Signaling Message Encryption (SME).

Once the mobile station is on the Traffic Channel, an OTASP Data Message is sent that an additional fee is charged for the use of the feature and requesting acknowledgment of acceptance. If accepted, a second OTASP Data Message is sent containing a Extended Feature Change Code (EFCC). If the EFCC matches the EFCC for the mobile station, it is verified by the mobile unit, after which it may be used to unlock the mobile station, update the feature code(s) and store the updated feature code(s) into the phone's memory. After verification of the programmed data in accordance with OTASP processing, the process is terminated. If the user refuses the additional billing, no downloading will occur. A number of different EFCCs may be used for different feature codes so that the user may elect the feature codes individually to avoid being billed for access to all possible optional extended features when only one is desired.

As specified in the IS-683 standards, delivery of OTASP Data Messages does not require sequential delivery of messages by the layer 2 protocol because OTASP procedures ensure that only one OTASP Data Message is outstanding at any time. Therefore, a Data Burst Message (OTASP BURST_TYPE) may be used in accordance with TIA/EIA/58, "Administration of Parameter Value Assignments for TIA/EIA Wideband Spectrum Standards". Data Burst Messages may also be used on the Control Channel (Paging/Access Channel) per IS-95 specifications.

Using a similar procedure, a visited network will need to confirm that the visiting mobile user is willing to pay for use of a feature within the visited network when the mobile user can use the same feature in his or her home network without additional charge. For example, call forwarding may be provided at no extra charge by some network providers, while others add a surcharge for the service. In this case, the visited network base station will send a message to the mobile station that a selected feature can be accessed only with payment of a toll by causing a message to be displayed on the display of the mobile station such as "Toll for Feature". The base station will then wait for confirmation from the mobile station before downloading the feature code which will allow activation of the feature.

It should be noted that the system-specific feature code information need not be included within system overhead information, nor is it limited to inclusion in a System Parameter Message, Mobile Station Registered Message, OTASP Data Message, or Data Burst Message. These messages are exemplary only. The system-specific feature code information can be included in any message, whether transmitted over a Paging Channel or a Traffic Channel, which is capable of initiating a downloading operation to the mobile station when a discrepancy exists between certain system operating parameters, in this case, the feature codes, and the access-enabling parameters stored within the mobile station. Whichever message type is used, an appropriate header or data field will need to be provided to designate the nature of the message as relating to feature code updating. As in the case of any new feature in standardized systems and data formats, addition of new system overhead information may require changes to existing IS-41 (Network Specification) specified messages, or other new messages may need to be defined by the standards organizations. Initiating such changes is an administrative task that will be readily apparent to those in the art.

To provide an example of the invisible nature of the feature code translation, FIG. 3 illustrates a Nokia® Model 2120 mobile phone. With the mobile phone initially in the Idle State, the "Menu" soft key 300 is pressed followed by numerical keys "6" 302 and "5" 304 to select the "Call Waiting" feature. Alternatively, the user can press the "Menu" soft key 300, then step forward or backward through the list of feature by pressing the "up arrow" 306 or "down arrow" 308 on key 310.

Once the desired function is displayed on display screen 312, the user then presses the "Select" soft key 314. To activate the Call Waiting feature, the user presses "up arrow" 306. To deactivate Call Waiting, the user presses "down arrow" 308.

Due to the differences between mobile handsets from different manufacturers, keys which perform a similar function may be labeled differently. For example, some manufacturers will call their equivalent of the Nokia® "Menu" key a "Feature" key. Other manufacturers may use different combinations of soft keys and hard keys. With the present method of remotely programming feature codes, the mobile user can utilize his or her preferred format (as selected based upon the chosen make of mobile handset), use the feature code selection method to which he or she is accustomed, and still be able to access the desired feature regardless of how dissimilarly a visited network has its feature codes set up.

Referring briefly to FIG. 2, the preceding keystroke sequence comprises a user input via user input 60 to processor 34. Using the system-specific feature code information stored in memory (either non-volatile memory 50 or RAM memory 40), processor 34 converts the selected feature into the appropriate feature code for the network which is then transmitted to the base station for implementation (activation or deactivation).

For mobile station handsets which do not have menu display capability, features are typically selected by a pressing a keystroke sequence designated by the mobile's home network. For example, if "*66#" (+"Send") is designated by the home network service provider for activating Call Waiting, and "*67#" (+"Send") for deactivating Call Waiting, the mobile user will press the four keys in the proper sequence. To continue the example, the visited network's feature codes for Call Waiting are "*55#" and "*56#" for activation and deactivation, respectively. Following the downloading of the correct system parameters, including the system-specific feature codes of the visited network, the mobile station's processor will cause the mobile station to transmit a "*55#", even when the user has pressed "*66#".

Where a feature code is entered preceding a phone number, for example, for Call Forwarding, it may be desirable to limit the translation of feature codes to a specific number of digits following the "*", so that the subsequent phone number is not also inadvertently converted. Again using the situation where the feature codes are selected by a two digit number, in the home network, Call Forwarding may be activated by entering "*44*555-4444#" (+"Send"), where 555-4444 is the phone number. In the visited network, the feature code to activate Call Forwarding may be "*55". To avoid the possibility of conversion of the phone number as well as the feature code, the processor would look only at the first two digits entered following the star key.

In a second embodiment of the method for remote programming of feature codes, the mobile station completes the registration procedure in the visited network, making it capable of communicating with the local base station. Rather than automatically downloading the local feature codes into the visiting mobile station's memory at the time of, or in response to the initial activation of the mobile station within the network, the base station waits until it receives an Origination Message from the mobile station over the Access Channel for a mobile-initiated call which includes an indication, i.e., the star key ("*"), that the mobile user wishes to access a feature, e.g., Call Forwarding. If the particular feature code value is not recognized by the base station, it may respond over the Paging Channel, or on the Traffic Channel after providing a channel assignment, with information containing the local feature code values for downloading into the mobile station's memory. The processor within the mobile station determines the correct local feature code and responds with an Origination Continuation Message to activate the Call Forwarding feature by re-sending the message using the correct feature code values for the visited network. In this embodiment, information regarding local feature code values is provided only when access to a feature is requested by the mobile user. Because the downloading of the feature code information is triggered by the request for access to a feature, the mobile user need not perform any additional steps beyond that to which he or she is already accustomed, with the conversion occurring internally within the mobile station's processor.

FIG. 4 provides an exemplary flow diagram for accessing a network-specific features code using a visiting mobile station in a visited network. The following assumptions apply:

1) The Mobile Station and Base Station each supports the Call Waiting feature without surcharge;
2) The Mobile Station's home network utilizes a different feature code for Call Waiting than is used by the visited network in which the Base Station is located; and
3) The Mobile Station has already performed the initial steps for registration in the visited network, including updating overhead information.

Using the example provided in FIG. 3, the user wishes to activate Call Waiting and enters "Menu", "6", "5", and "Send". Mobile Station 100 detects a user initiated call 101 which includes selection of a feature code (by depressing the "Menu" key) and sends an Origination Message 101 over Access Channel 150 to the visited network Base Station 200. Included in Origination Message 101 is the indication that a feature code is selected. Base Station 200 receives the message (Step 201), verifies the identity of the mobile station (step 202) and responds with a Mobile Station Registration Message 203 on the Paging Channel 160 which includes the new system-specific feature code values for the visited network. Mobile Station 100 processes the received new feature codes (step 103) and downloads the information into its memory (step 104). Processor 34 correlates the entered value ("Menu", "6", "5") with the system-specific feature code (*55) that was previously downloaded (step 105) and sends an Origination Continuation Message 106 which acknowledges the received information and includes the translated feature code value (*55). Base Station 200 received the message (step 204) and responds with an Acknowledgment Message 205, acknowledging activation of the Call Waiting feature. The call is then released (step 206).

In this case, the mobile user did not have to enter any different feature codes since the Mobile Station's processor automatically and transparently converted the feature code to the correct value for communicating with the visited network.

Figure 5:
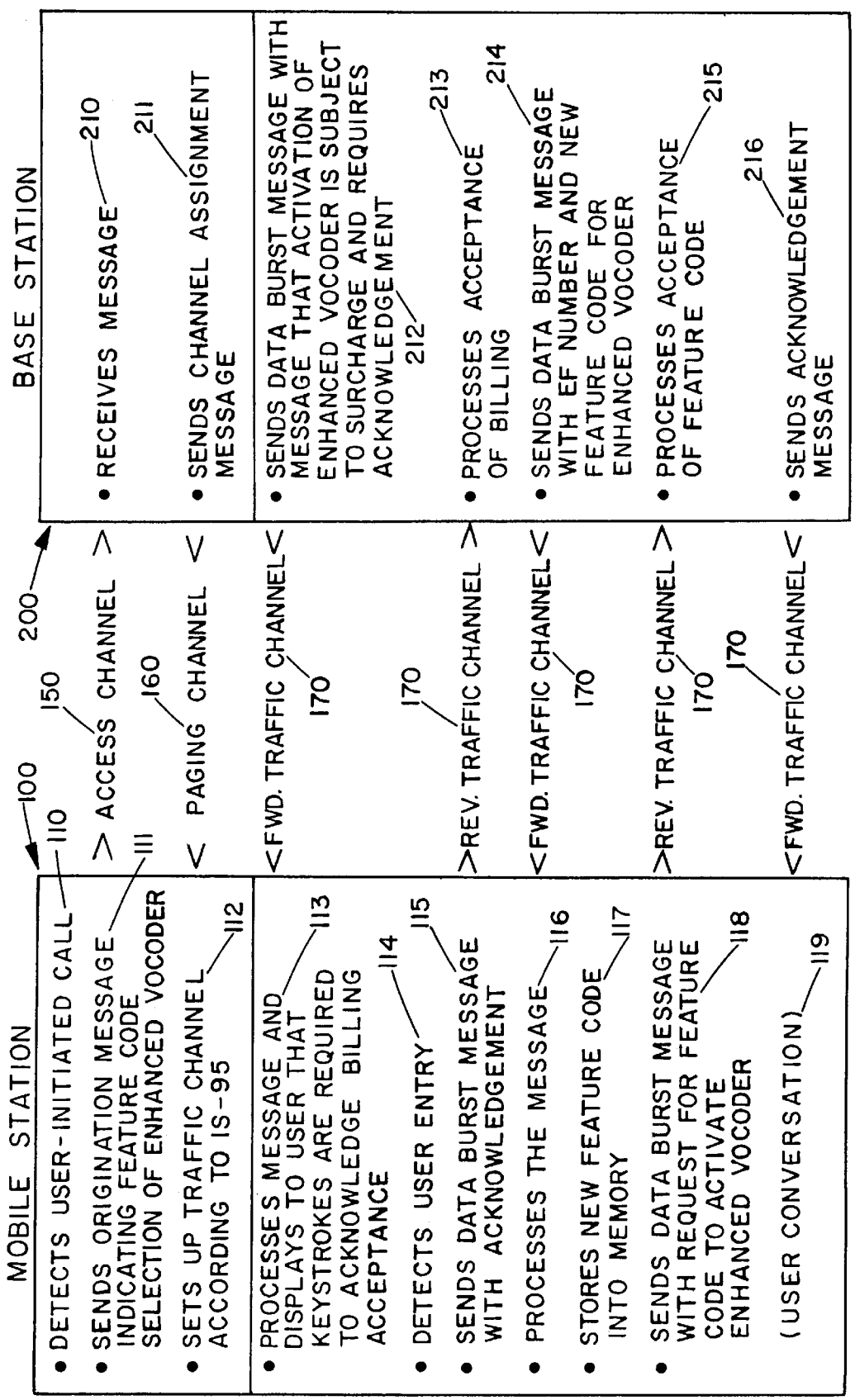
FIG. 5 is a diagram of an exemplary call flow for changing a feature code for a provisioned feature according to another embodiment of the invention.

In a second exemplary call flow shown in FIG. 5, the feature to be selected is one which requires provisioning. The following assumptions apply:

1) The Mobile Station and Base Station each supports the Enhanced Vocoder feature;
2) The Mobile Station's is initially programmed to utilize a different feature code for Enhanced Vocoder than is used by the Base Station; and
3) The Mobile Station is already registered with the Base Station.

In FIG. 5, the Mobile Station is, again, generally designated as 100 and the Base Station as 200. Mobile Station 100 detects a user initiated call 110 which includes selection of a feature code (by depressing the star key) and sends an Origination Message 111 over Access Channel 150 to the visited network Base Station 200. Included in Origination Message 111 is the indication that a feature code is selected. Base Station 200 received the message (step 210) and sets up a Traffic Channel, then sends a Channel Assignment Message 211 on the Paging Channel 160. Mobile Station 100 processes the Channel Assignment Message 211 and sets up the designated Traffic Channel 170 according to IS-95 procedures (step 112).

Base Station 200 sends a Data Burst Message 212 using OTASP BURST-TYPE fields which include information that the selected feature code is subject to a surcharge and a request for acceptance of the surcharge. Mobile Station 100 processes Data Burst Message 212 and indicates to the user that acknowledgment of acceptance is required (step 113). The user enters his or her acceptance by pressing the appropriate key (step 114), which is transmitted over the Reverse Traffic Channel to Base Station 200 as Data Burst Message 115. Base Station 200 processes the acceptance of billing (step 213) and sends a second Data Burst Message 214 including the EF number and the feature code for the Enhanced Vocoder feature. Mobile Station 100 processes Message 214 (step 116), downloading the feature code into its memory (step 117) and responds with Data Burst Message 118 requesting activation of the Enhanced Vocoder feature. Base Station 200 receives and processes the request (step 215), then sends Data Burst Message 216 with an indication that the feature is activated. The mobile user then proceeds with his or her conversation (step 119).

In addition to its application to allowing a mobile station to access network features when visiting other networks, the procedure for remotely programming feature codes in a mobile station can also be used in the mobile station's home network when new features or made available, or if the network adopts a feature code standard which differs from its previously designated feature codes. Further, the remote programming feature is not limited to mobile telephones and voice communications devices, but may also include pagers and data communications devices, which also utilize network features and, thus, are subject to loss of features when traveling outside of a home network, or which will require updating when new network features become available.

Other embodiments and modifications of the present invention will occur readily to those skilled in the art in view of these teachings. Therefore, this invention is to be limited only by the following claims, which include other embodiments and modifications when viewed in conjunction with the above specification and accompanying drawings.

I claim:

1. A method for accessing a plurality of network features enabled by a local set of feature codes using a mobile station having an original set of feature codes, the local set of feature codes being at least partially incompatible with the original set of feature codes, the method comprising:

communicating between a network base station and the mobile station to register the mobile station with the network base station;

transmitting the local set of feature codes from the base station to the mobile station;

comparing the local set of feature codes with the original set of feature codes;

if the local set of feature codes is at least partially incompatible with the original set of feature codes, storing the local set of feature codes within a memory of the mobile station;

selecting an original feature code from the original set of feature codes corresponding to a desired network feature of the plurality of network features using a user input on the mobile station;

processing within the mobile station the selected original feature code to correspond to a local feature code for accessing the desired network feature; and transmitting from the mobile station to the base station the local feature code corresponding to the desired network feature.

2. The method of claim 1, wherein the step of transmitting the local set of feature codes includes transmitting the local set of feature codes within a registration acknowledgment message.

3. The method of claim 1, wherein the step of transmitting the local set of feature codes includes transmitting the local set of feature codes within a Paging Channel Message.

4. The method of claim 1, wherein the step of transmitting the local set of feature codes includes transmitting the local set of feature codes within a Forward Traffic Channel Message.

5. The method of claim 4, wherein the Forward Traffic Channel Message is a Data Burst Message.

6. A method for accessing a plurality of network features enabled by a first set of feature codes using a mobile station having a second set of feature codes corresponding to the network features, the first set of feature codes having at least one feature code differing from the second set of feature codes, the method comprising:

communicating between a network base station and the mobile station to register the mobile station with the network base station;

transmitting the first set of feature codes from the base station to the mobile station;

comparing the first set of feature codes with the second set of feature codes;

if the first set of feature codes is different from the second set of feature codes, storing the first set of feature codes within a memory of the mobile station;

selecting a second feature code from the second set of feature codes corresponding to a provisioned network feature of the plurality of network features using a user input on the mobile station;

processing within the mobile station the selected second feature code to correspond to a first feature code for accessing the provisioned network feature;

transmitting from the mobile station to the base station the first feature code corresponding to the provisioned network feature;

transmitting from the base station a message requesting acceptance of a surcharge for the provisioned network feature; and awaiting acknowledgment of acceptance of the surcharge from the mobile station before transmitting a provisioned feature corresponding to the provisioned feature code.

7. The method of claim 1, wherein the step of transmitting from the mobile station the local set of feature codes includes a request for acknowledgment of successful accessing of the desired network feature.

8. A method for remotely enabling a mobile station having an original set of feature codes to access at least one local set of feature codes from a base station for use in selecting one or more network features of a local network, wherein the original set of feature codes is at least partially incompatible with the local set of feature codes, the method comprising:

selecting an original feature code of the original set of feature codes corresponding to a desired network feature of the one or more network features using a user input on the mobile station;

transmitting the selected original feature code to the base station;

transmitting from the base station the local set of feature codes; correlating within the mobile station the selected original feature code to a corresponding local feature code from the local set of feature codes;

transmitting from the mobile station to the base station the corresponding local feature code for the desired network feature; and transmitting from the base station an acknowledgment of successful selection of the desired network feature.

9. The method of claim 8, wherein the step of selecting an original feature code comprises entering a plurality of keystrokes at a keypad, the plurality of keystrokes including pressing a "Menu" key and selecting a pre-programmed menu location.

10. The method of claim 8, wherein the step of selecting an original feature code comprises entering a plurality of keystrokes at a keypad, the plurality of keystrokes including pressing a "star" key followed by at least one numeric key.

11. The method of claim 8, wherein the step of transmitting the local set of feature codes includes transmitting the local set of feature codes within a registration acknowledgment message.

12. The method of claim 8, wherein the step of transmitting the local set of feature codes includes transmitting the local set of feature codes within a Paging Channel Message.

13. The method of claim 8, wherein the step of transmitting the local set of feature codes includes transmitting the local set of feature codes within a Forward Traffic Channel Message.

14. The method of claim 13, wherein the Forward Traffic Channel Message is a Data Burst Message.

15. The method of claim 8, wherein one network feature of the one or more network features is a provisioned feature and further comprising the steps of transmitting from the base station a message requesting acceptance of a surcharge for the provisioned feature and awaiting acknowledgment of acceptance of the surcharge from the mobile station before transmitting a feature code corresponding to the provisioned feature.

16. A method for administering a wireless communications network comprising a base station and a plurality of mobile stations, each mobile station having an identity and a set of pre-determined selectable feature codes for accessing one or more network features, wherein a user of the mobile station is not required to initiate a procedure for changing the set of pre-determined selectable feature codes to a plurality of new feature codes, the method comprising:

programming the mobile station with a feature code change option and at least one feature code change number for permitting over-the-air provisioning of network features;

when provisioning of a network feature is requested by the user of the mobile station, transmitting a Page Message from a base station to the mobile station, the Page Message including a request to verify the identity of the mobile phone and a first data field for the feature code change option;

receiving a Page Response Message from the mobile phone to the base station including the identity of the mobile phone;

transmitting a Channel Assignment Message from the base station to the mobile phone, the Channel Assignment Message instructing the mobile phone to set up a traffic channel;

transmitting a Data Burst Message from the base station to the mobile phone instructing the mobile phone to enter an over-the-air service provisioning process;

transmitting the at least one feature code change number corresponding to the requested network feature from the base station to the mobile phone;

transmitting from the mobile phone to the base station a response verifying the at least one feature code change number;

downloading a new feature code of said plurality of new feature codes for accessing the requested network feature from the base station to the mobile phone, the new feature code not included in the set of pre-determined selectable feature codes;

transmitting a message from the base station to the mobile phone for requesting activation of the requested network feature; and acknowledging activation of the requested network feature.

17. The method of claim 16, further comprising the steps of transmitting from the base station a message requesting acceptance of a surcharge for the requested network feature and awaiting acknowledgment of acceptance of the surcharge from the mobile station before transmitting a feature code corresponding to the requested network feature.

18. A mobile phone having means for accessing a local set of feature codes for use in selecting at least one network features of a local network having a base station, wherein the mobile phone has a pre-determined means for selecting an original set of feature codes, and wherein the original set of feature codes is at least partially incompatible with the local set of feature codes, the mobile phone comprising:

a transceiver for receiving a message transmitted from the base station, the message including the local set of feature codes, and for transmitting responses and requests to the base station;

a first memory means for storing the original set of feature codes;

a second memory means for storing the local set of feature codes;

a processor comprising;

an input for receiving the message from the transceiver;

a comparator means for comparing the local set of feature codes with the original set of feature codes; and if the local set of feature codes is at least partially incompatible with the original set of feature codes, means for storing the local set of feature codes within the second memory means;

a correlation means for correlating a local feature code from the local set of feature codes to correspond an original feature code from the original set of feature codes in response to a user selection of the original feature code;

an output for sending the local feature code corresponding to the at least one network feature to the transceiver to transmit to the base station; and a user input in communication with the processor for selecting the original feature code corresponding to the at least one network feature.

19. The mobile phone of claim 18, wherein the message is a registration acknowledgment message.

20. The mobile phone of claim 18, wherein the message is a Paging Channel Message.

21. The mobile phone of claim 18, wherein the message is a Forward Traffic Channel Message.

22. The mobile phone of claim 18, wherein the message is a Data Burst Message.

23. A mobile phone with a pre-determined means for selecting an original set of feature codes for activating one or more network features of a local network responsive to at least one of a local set of feature codes, the original set of feature codes having at least one original feature code that is incompatible with the local set of feature codes, the local network having a base station, the mobile phone comprising:

a user input in communication with a processor for selecting an original feature code of the original set of feature codes corresponding to a desired network feature of the one or more network features;

a transceiver for transmitting a request for the selected original feature code to the base station and for receiving from the base station the local set of feature codes; and a memory means in communication with the processor for storing the local set of feature codes, the processor including means for correlating the selected original feature code to a corresponding local feature code from the local set of feature codes and causing the transceiver to transmit the corresponding local feature code for the desired network feature.

24. The mobile phone of claim 23, wherein the user input comprises a keypad including a "Menu" key and a plurality of function-selecting keys, wherein a combination of the "Menu" key followed by at least one function-selecting key selects an original feature code from a pre-programmed menu location in the memory means.

25. The mobile phone of claim 23, wherein the user input comprises a "star" key and a plurality of numeric keys, wherein a combination of the "star" key followed by at least one numeric key selects an original feature code.

26. A method for accessing a plurality of network features enabled by a first set of feature codes using a mobile station having a second set of feature codes corresponding to the network features, the first set of feature codes having at least one feature code differing from the second set of feature codes, the method comprising;

communicating between a network base station and the mobile station to register the mobile station with the network base station;

transmitting the first set of feature codes from the base station to the mobile station;

comparing the first set of feature codes with the second set of feature codes;

if the first set of feature codes is different from the second set of feature codes, storing the first set of feature codes within a memory of the mobile station;

selecting a second feature code from the second set of feature codes corresponding to a desired network feature of the plurality of network features using a user input on the mobile station; processing within the mobile station the selected second feature code to correspond to a first feature code for accessing the desired network feature;

transmitting from the mobile station to the base station the first feature code corresponding to the desired network feature; and if the first set of feature codes includes a new feature code for a new network feature that is unavailable in the second set of feature codes of the mobile station, informing the user of the availability of the new feature code, and establishing means for the user to utilize the new feature code.

27. The method of claim 8, wherein the local set of feature codes includes an additional feature code for an additional network feature that does not correspond to an original feature code of the original set of feature codes, further comprising the steps of:

notifying the user of the additional feature code; and prompting the user for an acknowledgment of the additional feature code.

28. A mobile phone having means for accessing a new set of feature codes for use in selecting one or more network features of a local network having a base station, wherein the mobile phone has a pre-determined means for selecting an original set of feature codes, the mobile phone comprising:

a transceiver for receiving a message transmitted from the base station, the message including the new set of feature codes, and for transmitting responses and requests to the base station;

a first memory means for storing the original set of feature codes;

a second memory means for storing the new set of feature codes;

a processor comprising;

an input for receiving the message from the transceiver;

a comparator means for comparing the new set of feature codes with the original set of feature codes; and if the new set of feature codes is different from the original set of feature codes, means for storing the new set of feature codes within the second memory means;

a correlation means for correlating a new feature code from the new set of feature codes to correspond an original feature code from the original set of feature codes in response to a user selection of the original feature code;

an output for sending the new feature code corresponding to the desired network feature to the transceiver to transmit to the base station;

a means for identifying an additional feature code from the new set of feature codes that does not correspond to an original feature code; and notification means for notifying a user of the availability of the additional feature code; and a user input in communication with the processor for selecting the original feature code corresponding to a desired network feature.

29. A mobile phone with a pre-determined means for selecting an original set of feature codes for activating one or more network features of a local network responsive to at least one of a new set of feature codes, the local network having a base station, the mobile phone comprising:

a user input in communication with a processor for selecting an original feature code of the original set of feature codes corresponding to a desired network feature of the one or more network features;

a transceiver for transmitting a request for the selected original feature code to the base station and for receiving from the base station the new set of feature codes;

a memory means in communication with the processor for storing the new set of feature codes, the processor including means for correlating the selected original feature code to a corresponding new feature code from the new set of feature codes and causing the transceiver to transmit the corresponding new feature code for the desired network feature; and wherein the new set of feature codes includes at least one local code that is unavailable in the original set of feature codes, the processor further including means to notify the user of the availability of the at least one local code.

* * * * *